(12) United States Patent
Shibata et al.

(10) Patent No.: US 11,217,827 B2
(45) Date of Patent: Jan. 4, 2022

(54) METHOD FOR MANUFACTURING BATTERY, BATTERY, AND WINDING DEVICE

(71) Applicant: MURATA MANUFACTURING CO., LTD., Kyoto (JP)

(72) Inventors: Hironori Shibata, Kyoto (JP); Akira Sasaki, Kyoto (JP); Takeshi Honda, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 147 days.

(21) Appl. No.: 16/529,249

(22) Filed: Aug. 1, 2019

(65) Prior Publication Data

US 2019/0356022 A1   Nov. 21, 2019

Related U.S. Application Data

(63) Continuation of application No. PCT/JP2017/036308, filed on Oct. 5, 2017.

(30) Foreign Application Priority Data

Feb. 1, 2017   (JP) .............................. JP2017-016585

(51) Int. Cl.
*H01M 10/0587* (2010.01)
*H01M 10/058* (2010.01)
*B65H 18/26* (2006.01)

(52) U.S. Cl.
CPC ........ *H01M 10/0587* (2013.01); *B65H 18/26* (2013.01)

(58) Field of Classification Search
CPC ......... H01M 10/0587; H01M 10/0525; H01M 4/13; H01M 4/30
See application file for complete search history.

(56) References Cited

U.S. PATENT DOCUMENTS

2004/0247999 A1* 12/2004 Shirane ............. H01M 10/0431
429/161
2012/0174386 A1   7/2012 Katayama et al.
(Continued)

FOREIGN PATENT DOCUMENTS

JP    60-37677      2/1985
JP    S6037677 A    2/1985
(Continued)

OTHER PUBLICATIONS

Machine Translation of: JP 2012/038439A, Kusama et al., Feb. 23, 2012.*
(Continued)

*Primary Examiner* — Kenneth J Douyette
(74) *Attorney, Agent, or Firm* — K&L Gates LLP

(57) ABSTRACT

A method for manufacturing a battery is provided. The method includes suctioning a part of a strip-shaped separator in a plurality of holes of a winding core in a peripheral surface of the winding core; preparing a wound body by winding strip-shaped positive and negative electrodes along with the strip-shaped separator around the winding core; and preparing an electrode body by releasing the suction in the holes and pulling out the winding core from the wound body, in which the battery includes a battery container configured to accommodate the electrode body, the holes are communicated inside with the winging core having a hollow structure, and the winding core has an outside diameter of 2 mm or less.

10 Claims, 14 Drawing Sheets

(56) References Cited

U.S. PATENT DOCUMENTS

2014/0302367 A1* 10/2014 Ueno ................ H01M 10/0468
429/94
2016/0260939 A1 9/2016 Horikoshi et al.

FOREIGN PATENT DOCUMENTS

| JP | 2001351669 A | 12/2001 |
| JP | 2006216520 A | 8/2006 |
| JP | 2009-193750 | 8/2009 |
| JP | 2009193750 A | 8/2009 |
| JP | 2012-038439 | 2/2012 |
| JP | 2012038439 A | 2/2012 |
| JP | 2012195296 A | 10/2012 |
| JP | 2013-065535 | 4/2015 |
| JP | 2015-115293 | 6/2015 |
| JP | 2015115293 A | 6/2015 |
| JP | 2016-015327 | 1/2016 |
| WO | 2013/065535 | 4/2015 |
| WO | 2014/132660 | 2/2017 |

OTHER PUBLICATIONS

Machine Translation of: JP 2001/351669A, Yamada, Dec. 21, 2001.*
Japanese Office Action dated Jun. 2, 2020, in corresponding Japanese Application No. 2018-565920.
International Search Report for Application No. PCT/JP2017/036308, dated Jan. 9, 2018.
Japanese Office Action dated Dec. 9, 2020 in corresponding Japanese Application No. 2018-565920.

* cited by examiner

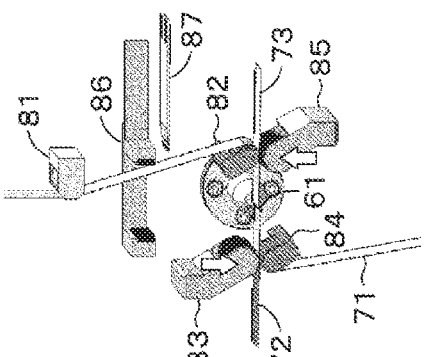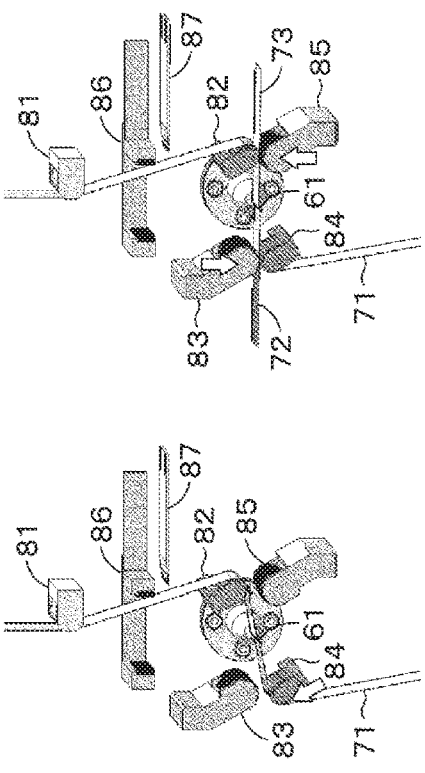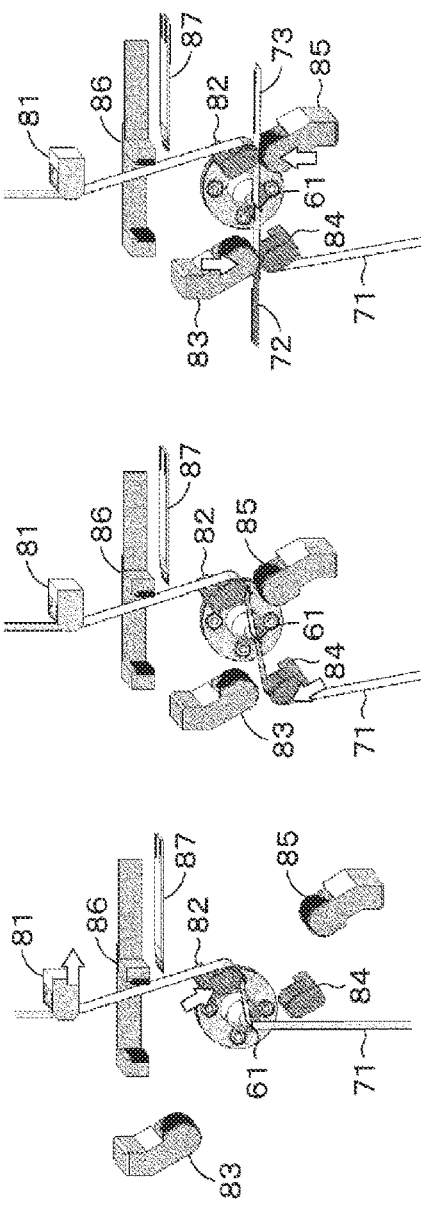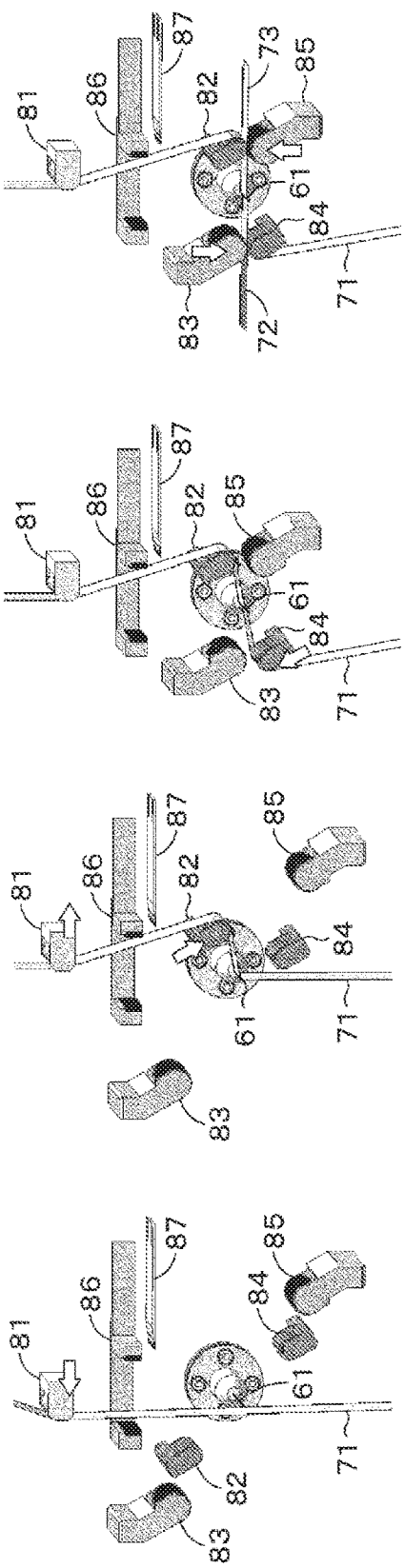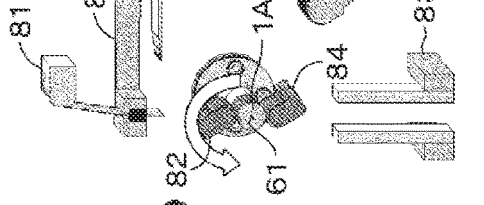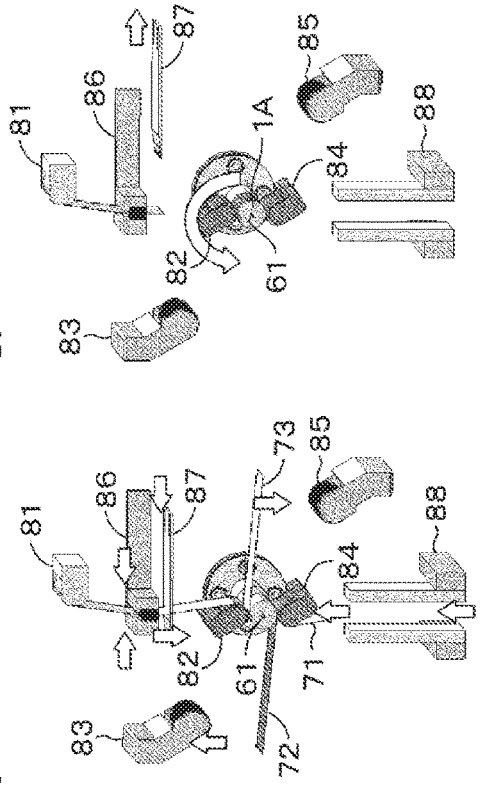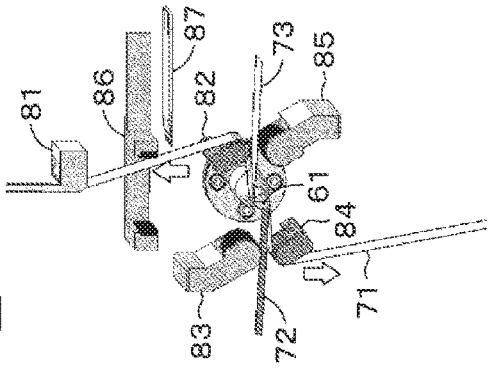

METHOD FOR MANUFACTURING BATTERY, BATTERY, AND WINDING DEVICE

CROSS REFERENCE TO RELATED APPLICATIONS

The present application is a continuation of PCT patent application no. PCT/JP2017/036308, filed on Oct. 5, 2017, which claims priority to Japanese patent application no. JP2017-016585 filed on Feb. 1, 2017, the entire contents of which are being incorporated herein by reference.

BACKGROUND

The present technology generally relates to a method for manufacturing a battery, a battery, and a winding device.

In recent years, secondary batteries have been expanded in application including portable devices such as mobile phones, tablet computers, or small electric tools, as well as electric vehicles such as electric bicycles and hybrid cars. A lithium ion secondary battery is widely known as one of such secondary batteries.

SUMMARY

The lithium ion secondary battery can be reduced in size for use, depending on the intended use. In order to prepare a small-size lithium ion secondary battery, it is desirable to use a manufacturing method and a winding device which are suitable for the preparation of the battery.

An object of the present technology is to provide a method for manufacturing a battery, for example, which is suitable for preparing a small-size secondary battery, a battery, and a winding device.

According to an embodiment of the present technology, a method for manufacturing a battery is provided. The method includes:

suctioning a part of a strip-shaped separator in a plurality of holes of a winding core in a peripheral surface of the winding core;

preparing a wound body by winding strip-shaped positive and negative electrodes along with the strip-shaped separator around the winding core; and preparing an electrode body by releasing the suction in the holes and pulling out the winding core from the wound body,
in which
the battery includes a battery container configured to accommodate the electrode body,
the holes are communicated inside with the winging core having a hollow structure, and
the winding core has an outside diameter of 2 mm or less.

According to an embodiment of the present technology, a battery including an electrode body wound in a cylindrical shape with a hollow in a center,
in which
the electrode body has an outside diameter of 10 mm or less,
the electrode body has an inside diameter of 2 mm or less, and
a ratio of a minimum value of the outside diameter of the electrode body to a maximum value of the outside diameter of the electrode body is 0.99 or more and 1.00 or less.

According to an embodiment of the present technology, a winding device is provided. The winding device includes:

a winding shaft including a winding shaft including a winding core; and a support configured to support the winding shaft movably in an axial direction of the winding shaft,
in which
the winding core has an outside diameter of 2 mm or less, and has a plurality of holes in a peripheral surface of the winding core, and
the winding core and the winding shaft have a hollow connected to the plurality of holes.

At least an embodiment of the present technology can provide a method for manufacturing a battery, which is suitable for preparing a small-size secondary battery, a battery, and a winding device.

It should be understood that the effects described herein are not necessarily to be considered limited, and may be any of the effects described in the present technology. In addition, the contents of the present technology are not to be construed as being limited by the exemplified effects, and other suitable properties relating to the present technology may be realized and as further described.

BRIEF DESCRIPTION OF THE FIGURES

FIGS. 11A to 11G are each a process diagram for illustrating an example of a method for manufacturing an electrode body according to an embodiment of the present technology.

DETAILED DESCRIPTION

As described herein, the present disclosure will be described based on examples with reference to the drawings, but the present disclosure is not to be considered limited to the examples, and various numerical values and materials in the examples are considered by way of example.

The embodiments and the like described below are preferred specific examples of the present technology, and the contents of the present technology are not to be considered limited to the embodiments and the like.

Figure 1A:
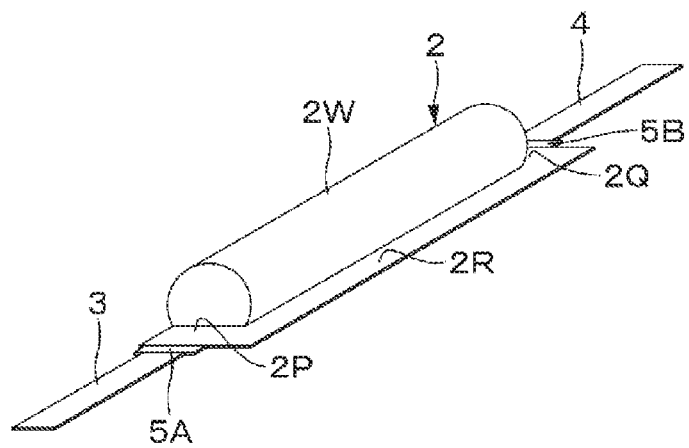
FIGS. 1A and 1B are perspective views illustrating an overview example of a battery according to an embodiment of the present technology.
Figure 1B:
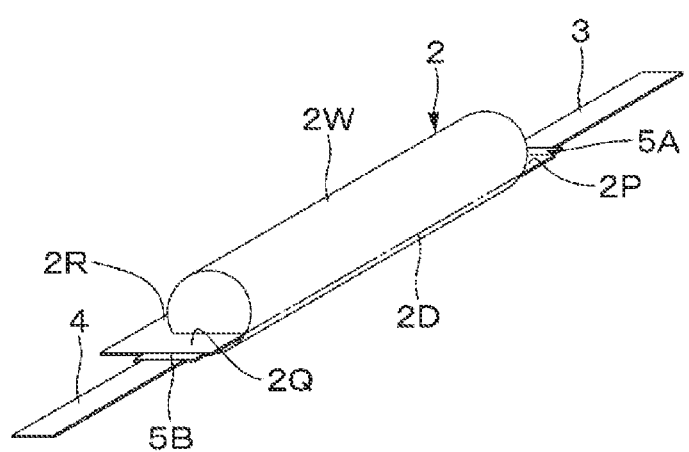
Figure 1C:
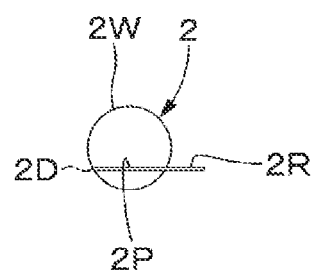
FIG. 1C is a front view illustrating an overview example of a battery according to an embodiment of the present technology.
Figure 2:
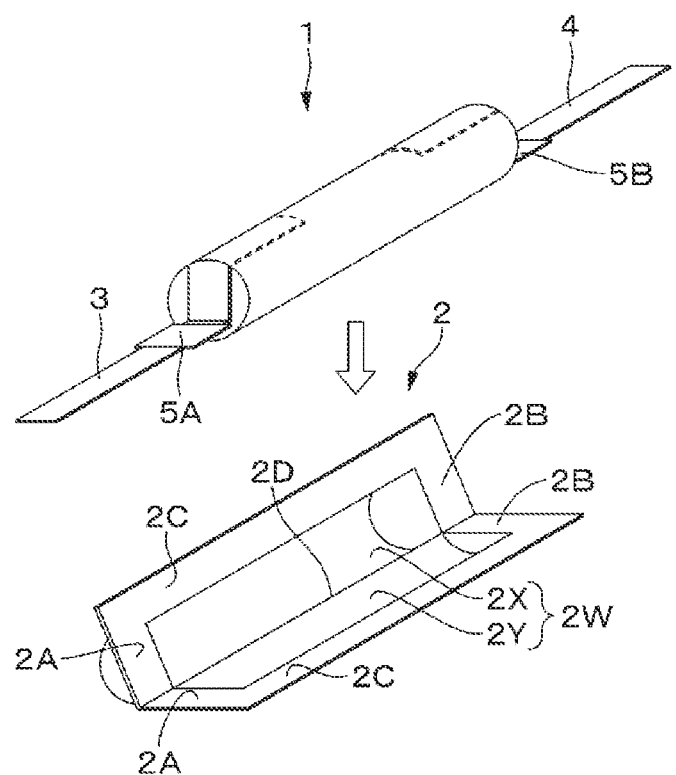
FIG. 2 is an exploded perspective view illustrating a configuration example of a battery according to an embodiment of the present technology.

FIGS. 1A, 1B, and 1C show an example of the appearance of a battery according to an embodiment of the present technology. FIG. 2 shows a configuration example of a battery according to an embodiment of the present technology. A film-exterior battery (hereinafter, simply referred to as "battery") according to an embodiment of the present technology is a so-called lithium ion secondary battery including a substantially cylindrical wound electrode body (hereinafter simply referred to as "electrode body") 1, a film-shaped exterior material 2 that has a substantially cylindrical housing part 2W for housing the electrode body 1 and sealed parts 2P, 2Q, 2R provided on three sides of the periphery of the housing part 2W except a folded back part 2D at the peripheral surface, and a positive electrode lead 3 and a negative electrode lead 4 connected to the electrode body 1. The battery according to an embodiment of the present technology is a small-size pin-shaped battery as a whole.

The sealed parts 2P and 2Q are provided at both end surfaces of the housing part 2W, and the sealed part 2R is provided at the peripheral surface of the housing part 2W. The sealed parts 2P and 2Q are provided to deviate from the centers of the substantially circular end surfaces of the housing part 2W and stand substantially perpendicular to the end surface.

Figure 3A:
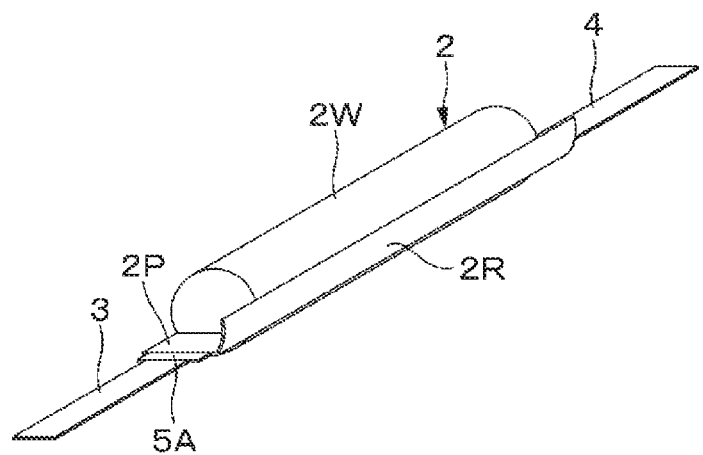
FIG. 3A is a perspective view illustrating an overview example of a battery according to a modification example of an embodiment of the present technology.
Figure 3B:
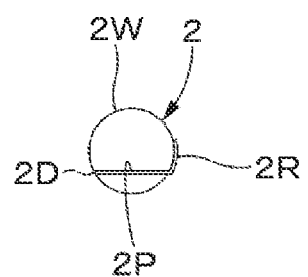
FIG. 3B is a front view illustrating an overview example of a battery according to a modification example of an embodiment of the present technology.

The sealed part 2R may be provided to stand substantially perpendicularly to the substantially cylindrical peripheral surface of the housing part 2W as shown in FIGS. 1A and 1C, or may be curved so as to follow the substantially cylindrical peripheral surface of the housing part 2W as shown in FIGS. 3A and 3B, but preferably curved like the latter. This is because the shape of the peripheral surface of the battery can be made a shape closer to a cylindrical surface, thereby further reducing the size of the entire battery.

One end of the positive electrode lead 3 is electrically connected to a positive electrode of the electrode body 1, and the other end of the positive electrode lead 3 is extended to the outside of the exterior material 2 through the sealed part 2P. Further, one end of the negative electrode lead 4 is electrically connected to a negative electrode of the electrode body 1, and the other end of the negative electrode lead 4 is extended to the outside of the exterior material 2 through the sealed part 2Q.

Preferably, a sealant material 5A such as a thermal fusion material is provided between the positive electrode lead 3 and the exterior material 2. Further, a sealant material 5B such as a thermal fusion material is preferably also provided between the negative electrode lead 4 and the exterior material 2. Thus, the adhesiveness can be improved between the positive electrode lead 3 and the negative electrode lead 4 extended from the exterior material 2 and the inner surface of the exterior material 2.

It should be understood that the connecting position between the positive electrode lead 3 and the electrode body 1 and the connection position between the negative electrode lead 4 and the electrode body 1 are not particularly limited, and may be any of the inner periphery, middle periphery, and outer periphery of the electrode body 1. In a case in which the positive electrode lead 3 and the negative electrode lead 4 are both connected to the outer periphery of the electrode body 1, the connecting positions are preferably opposed to each other on the peripheral surface of the electrode body 1. Specifically, the respective connecting positions are preferably provided along a straight line parallel to the axis of the electrode body 1. This is because the shape of the peripheral surface of the electrode body 1 can be made a shape closer to a cylindrical surface.

The positive electrode lead 3 and the negative electrode lead 4 are preferably bent in an L shape to follow the end surface of the electrode body 1. This is because the volumetric efficiency of the housing part 2W can be enhanced. The positive electrode lead 3 and the negative electrode lead 4 extended to the outside of the exterior material 2 may be extended straight or may be folded back toward the end surface of the housing part 2W.

Each of the positive electrode lead 3 and the negative electrode lead 4 is made from, for example, a metal material such as aluminum, copper, nickel, or stainless steel, which has the form of a thin plate or a net. The sealant materials 5A, 5B are each made from a material that has adhesiveness to the positive electrode lead 3 or the negative electrode lead 4, for example, a polyolefin resin such as polyethylene, polypropylene, modified polyethylene, or modified polypropylene.

As shown in FIG. 2, the exterior material 2 has two substantially partial cylindrical housing parts 2X and 2Y that are extended in the same direction, arranged in a direction orthogonal to the extending direction, and different in depth, and peripheral edges 2A, 2B, and 2C provided on the three sides of both end surfaces and peripheral surfaces (side surfaces) of the housing parts 2X and 2Y. In this regard, the substantially partial cylindrical shape refers to a shape obtained by cutting and dividing the substantially cylindrical shape in the axial direction into two. The substantially partial cylindrical shape of the housing part 2X is one of the shapes divided into two as mentioned above, and the substantially partial cylindrical shape of the housing part 2Y is the other of the shapes divided into two as mentioned above.

The exterior material 2 is folded back at a folded back part 2D between the adjacent housing parts 2X and 2Y, and the peripheral edges 2A, 2B, 2C of the housing parts 2X and 2Y are overlapped with each other, and the housing parts 2X and 2Y are combined. The overlapped peripheral edges 2A, 2B, 2C are respectively subjected to sealing to each other by thermal fusion bonding or the like to form the sealed parts 2P, 2Q, 2R. The substantially cylindrical housing part 2W is formed by the substantially partial cylindrical housing parts 2X and 2Y combined.

As shown in FIGS. 1B and 1C, the folded back part 2D is preferably provided so as not to protrude with respect to the peripheral surface of the housing part 2W. This is because the shape of the peripheral surface of the battery can be made a shape closer to a cylindrical surface. In this regard, simple wrinkles of the exterior material 2 are considered excluded from the above-mentioned "protrusion". The sealed part 2R is curved so as to follow the peripheral surface of the substantially cylindrical shape of the housing part 2W as described above, and in such a case, the sealed part 2R may be curved so as to follow the peripheral surface of the substantially partial cylindrical shape of the housing part 2X, or curved so as to follow the peripheral surface of the substantially partial cylindrical shape of the housing part 2Y, but preferably curved so as to follow the peripheral surface of the substantially partial cylindrical shape of the housing part 2Y which is shallower in depth.

Figure 4:
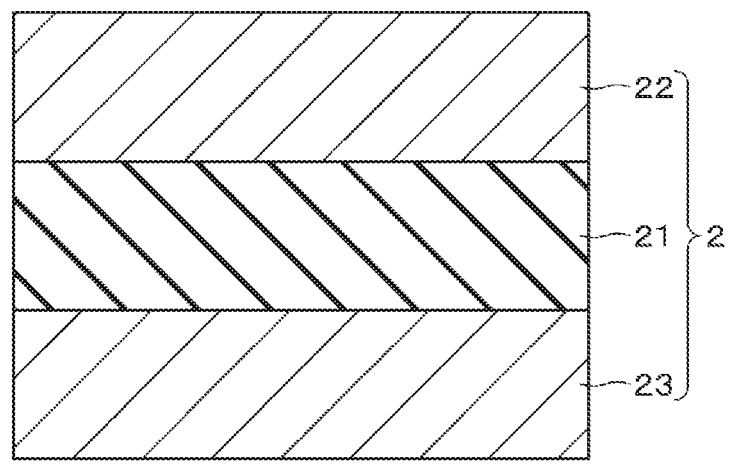
FIG. 4 is a schematic cross-sectional view illustrating a configuration example of an exterior material.

The exterior material 2 has plasticity. The exterior material 2, which is a so-called laminate film, includes a metal layer 21, a surface protection layer 22 provided on one surface of the metal layer 21, and a thermal fusion layer 23 on the other surface of the metal layer 21, as shown in FIG. 4. The exterior material 2 may further include an adhesive layer, if necessary, one or both of: between the surface protection layer 22 and the metal layer 21; and between the thermal fusion layer 23 and the metal layer 21. It is to be noted that, of the both sides of the exterior material 2, the surface on the surface protection layer 22 is regarded as the outer surface (hereinafter, referred to as "the outer surface of the exterior material 2"), and the surface on the thermal fusion layer 23 is regarded as the inner surface (hereinafter, referred to as "the inner surface of the exterior material 2") which houses the electrode body 1.

The metal layer 21 plays a role to prevent the ingress of moisture and the like and protect the electrode body 1 which is a housed object. For example, a metal foil made of aluminum or an aluminum alloy is used as a material of the metal layer 21. As a material for the surface protection layer 22, for example, nylon or polyethylene terephthalate is used from the viewpoints of toughness and flexibility. As a material for the thermal fusion layer 23, for example, a polyolefin-based resin such as polyethylene, polypropylene, modified polyethylene, or modified polypropylene is used from the viewpoints of flexibility and suppressed ingress of moisture and the like. For example, an acrylic adhesive material, a polyester-based adhesive material, or a polyurethane-based adhesive material is used as a material for the adhesive layer. Further, from the viewpoint of appearance beauty or the like, the exterior material 2 may further include a colored layer, or include a coloring material in at least one of the surface protection layer 22, the thermal fusion layer 23, and the adhesive layer.

The electrode body 1 has a positive electrode, a negative electrode and a separator which each have an elongated rectangular shape, and has a wound structure in which the positive electrode and the negative electrode are wound in the longitudinal direction with the separator interposed therebetween. The positive electrode has, for example, a metal foil such as aluminum as a positive electrode current collector, and on both sides of the collector, a positive electrode active material layer including a positive electrode active material. The negative electrode has, for example, a metal foil such as copper as a negative electrode current collector, and on both sides of the collector, a negative electrode active material layer including a negative electrode active material. It should be understood that, nickel, stainless steel, or the like can also be used as a material for the positive electrode current collector and the negative electrode current collector.

The positive electrode active material is a positive electrode material capable of occluding and releasing lithium. As the positive electrode active material, a lithium containing compound is suitable, for example, such as a lithium oxide, a lithium phosphorus oxide, a lithium sulfide or an intercalation compound containing lithium, and two or more thereof may be used in mixture. In order to increase the energy density, a lithium-containing compound including lithium, a transition metal element, and oxygen is preferred. Examples of such a lithium-containing compound include, for example, a lithium composite oxide that has a layered rock-salt type structure, or a lithium composite phosphate that has an olivine-type structure. The lithium-containing compound preferably contains at least one selected from the group consisting of cobalt, nickel, manganese, or iron as the transition metal element. In addition to the foregoing, other examples of the positive electrode material capable of occluding and releasing lithium also include inorganic compounds containing no lithium, such as $MnO_2$, $V_2O_5$, $V_6O_{13}$, NiS, and MoS.

The negative electrode active material is a negative electrode material capable of occluding and releasing lithium, and examples thereof include, for example, carbon materials such as non-graphitizable carbon, graphitizable carbon, graphite, pyrolytic carbon, coke, glassy carbon, a fired body of organic polymer compound, carbon fiber, or activated carbon. As the graphite, it is preferable to use natural graphite subjected to a spheroidizing treatment or the like, or substantially spherical artificial graphite. As the artificial graphite, artificial graphite obtained by graphitizing mesocarbon microbeads (MCMB), artificial graphite obtained by graphitizing or crushing a coke raw material, and the like are preferred. Examples of the coke include pitch coke, needle coke, and petroleum coke. The fired body of organic polymer compound refers to a product carbonized by firing a polymer material such as phenolic resins or furan resins at appropriate temperatures, and some of the products are classified in non-graphitizable carbon or graphitizable carbon. Examples of the polymer material include polyacetylene and polypyrrole. These carbon materials are preferred because the crystal structures produced during charging/discharging undergo little change, thereby making it possible to achieve a high charge/discharge capacity, and making it possible to achieve favorable cycle characteristics.

In addition, Examples of the negative electrode material capable of occluding and releasing lithium also include a material containing, as a constituent element, at least one of a metal element and a metalloid element. This negative electrode material may be a single metal element or semimetal element, or an alloy or a compound thereof, or may be a mixture or a composite thereof. In addition, the foregoing materials may have a solid solution, a eutectic (eutectic mixture), an intermetallic compound, or have co-existence of two or more thereof. Examples of the metal element and metalloid element include magnesium, boron, aluminum, gallium, indium, silicon, germanium, tin, lead, bismuth, cadmium, silver, zinc, hafnium, zirconium, yttrium, palladium, and platinum. These elements may be crystalline or amorphous. Above all, a material containing, as a constituent element, a metal element or a metalloid element of Group 4B in the short periodic table is preferred, and in particular, a material containing at least one of silicon and tin as a constituent element is preferred. This is because silicon and tin are high in ability to occlude and release lithium, and thus capable of achieving a high energy density.

The separator is intended to allow lithium ions to pass therethrough while preventing a short circuit with current due to contact between positive and negative electrodes, and is, for example, a porous membrane made from a synthetic resin of polyethylene, polypropylene, polytetrafluoroethylene, or a mixture or a copolymer thereof, or a porous membrane made from a ceramic, and two or more of these porous membranes may be laminated. Above all, a porous membrane made from polyolefin is preferred because the membrane has an excellent short circuit-prevention effect, and can make an improvement in the safety of the battery by a shutdown effect at high temperatures, and in particular, a porous membrane made from polyethylene is preferred.

The electrode body 1 includes a non-aqueous electrolyte. It should be understood that an electrolyte layer including a non-aqueous electrolytic solution and a polymer compound that holds the non-aqueous electrolytic solution may be provided together with the separator between the positive and negative electrodes. In this case, the electrolyte layer may be used instead of the separator, without the separator. The non-aqueous electrolytic solution includes a solvent and an electrolyte salt. In addition, in order to improve battery characteristics, the non-aqueous electrolytic solution may further include a known additive.

Examples of the solvent include ethylene carbonate, propylene carbonate, butylene carbonate, vinylene carbonate, dimethyl carbonate, diethyl carbonate, ethyl methyl carbonate, 4-fluoro-1,3-dioxolan-2-one, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, ethyl acetate, methyl propionate, ethyl propionate, propyl propionate, acetonitrile, succinonitrile, adiponitrile, methoxyacetonitrile, 3-methoxypropionitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, and ethylene sulfide. Among the examples, the use of at least one of the group consisting of 4-fluoro-1,3-dioxolan-2-one, ethylene carbonate, propylene carbonate, vinylene carbonate, dimethyl carbonate, and ethyl methyl carbonate in mixture is preferred because excellent charge/discharge capacity characteristics and charge/discharge cycle characteristics can be achieved.

The electrolyte salt includes one or two or more lithium salts. Examples of the lithium salts include lithium hexafluorophosphate, lithium tetrafluoroborate, lithium hexafluoroarsenate, lithium perchlorate, lithium trifluoromethanesulfonate, lithium bis(trifluoromethanesulfonyl)imide, lithium bis(pentafluoroethanesulfonyl)imide, tris(trifluoromethanesulfonyl) methyl lithium, lithium chloride, and lithium bromide.

Examples of the polymer compound include, for example, polyacrylonitrile, polyvinylidene fluoride, a copolymer of vinylidene fluoride and hexafluoropropylene, polytetrafluoroethylene, polyhexafluoropropylene, a polyethylene oxide, a polypropylene oxide, polyphosphazene, polysiloxane, polyvinyl acetate, polyvinyl alcohol, a polyacrylic acid, a polymethacrylic acid, polymethyl methacrylate, a styrene-butadiene rubber, a nitrile-butadiene rubber, polystyrene, or polycarbonate. In particular, from the viewpoint of electrochemical stability, polyacrylonitrile, polyvinylidene fluoride, polyhexafluoropropylene, or polyethylene oxide is preferred.

Figure 5:
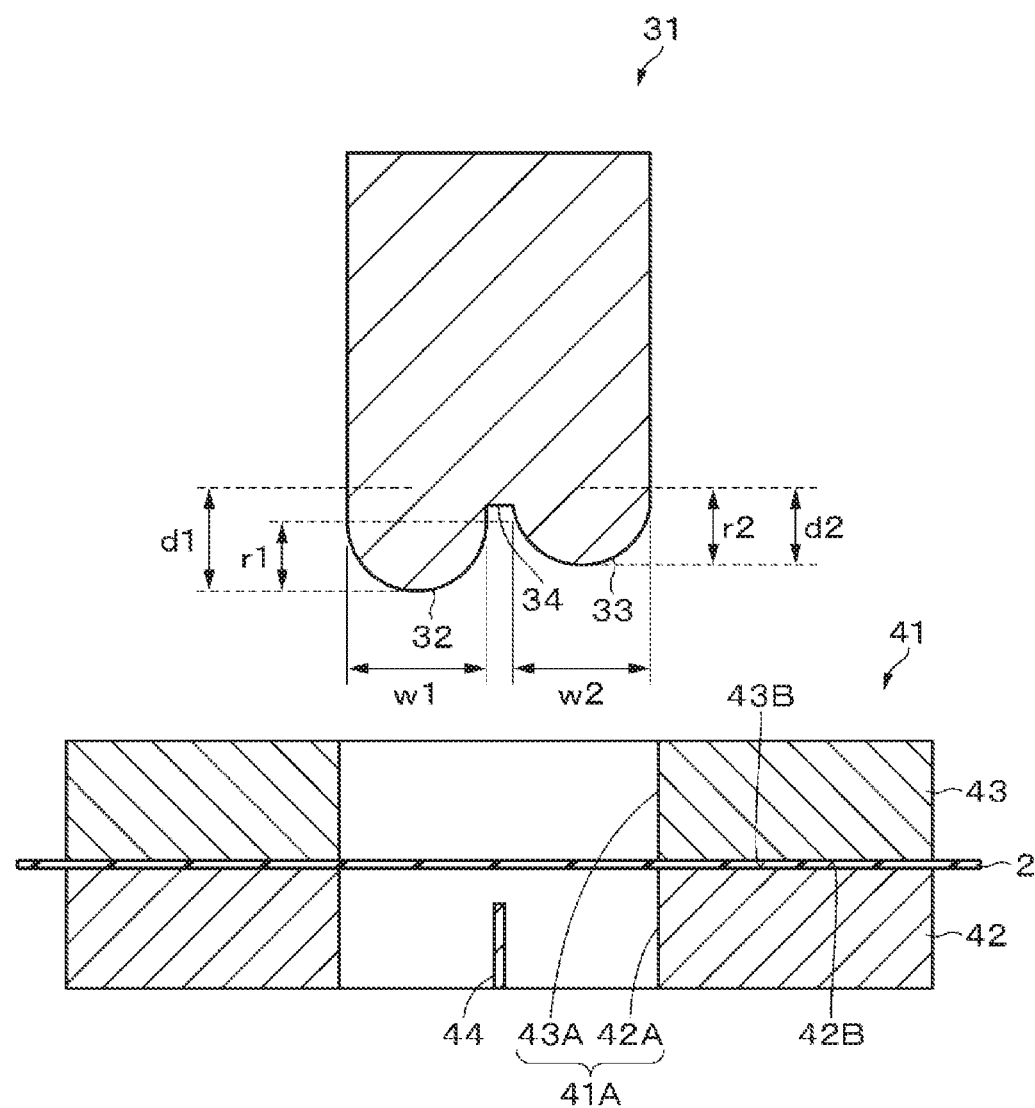
FIG. 5 is a schematic cross-sectional view illustrating a configuration example of a deep drawing device according to an embodiment of the present technology.

Next, a configuration example of a deep drawing device for use in the manufacture of a battery according to an embodiment of the present technology will be described with reference to FIG. 5.

The deep drawing device includes a punch 31 and a die 41 with a hole 41A into which the punch 31 is pushed. The punch 31 is held by a driving unit (not shown) so as to allow to be pushed into the hole 41A and pulled out from the hole 41A. The punch 31 has two substantially partial cylindrical emboss molding parts (hereinafter, simply referred to as "molding parts") 32, 33 that are extended in the same direction, arranged in a direction orthogonal to the extending the extension, and different in height.

The molding parts 32 and 33 of the punch 31 are configured to satisfy the relations of the following formulas (1a) to (3a).

$$d1>d2 \quad (1a)$$

(in the formula (1a), d1 and d2 respectively represent the heights of the molding parts 32 and 33)

$$r1=r2 \quad (2a)$$

(in the formula (2a), r1 and r2 respectively represent the radii of the molding parts 32 and 33)

$$w1=w2 \quad (3a)$$

(in the formula (3a), w1 and w2 respectively represent the widths of the molding parts 32 and 33)

The molding parts 32, 33 of the punch 31 may be configured to satisfy the relations of the following formulas (1b) to (3b).

$$d1>d2 \quad (1b)$$

$$r1>r2 \quad (2b)$$

$$w1>w2 \quad (3b)$$

The die 41 has a lower die (lower die) 42 that has a placement surface 42B for placing the exterior material 2 and an upper die (upper die) 43 that has a pressing surface 43B for pressing the wrinkles of the exterior material 2 placed on the lower die 42, and thus has a configuration capable of holding the exterior material 2 between the lower die 42 and the upper die 43. The lower die 42 and the upper die 43 respectively have the holes 42A and 43A which serve as through holes, and the holes 42A and 43A are overlapped with each other to form a hole 41A.

The lower die 42 preferably has a plate-shaped supporting member 44 for supporting the exterior material 2 deformed by the punch 31 at the boundary 34 between the molding parts 32 and 33. The supporting member 44 is provided in the central part of the hole 42A such that the top of the supporting member 44 is opposed to the boundary 34. The adoption of the supporting member 44 can reduce the distance between the housing parts 2X and 2Y, thereby making it possible to seal the electrode body 1 in the exterior material 2, without causing the folded back part 2D of the exterior material 2 to protrude with respect to the peripheral surface of the housing part 2W. Thus, the housing part 2W can be made closer to a cylindrical shape.

The top (tip) of the supporting member 44 opposed to the boundary 34 is preferably located to be shifted in the pressing direction (pushing direction) of the punch 31 with respect to the placement surface 42B of the lower die 42 as a baseline, more specifically, located (inside) lower than the placement surface 42B of the lower die 42. The difference in position between the top of the supporting member 44 and the placement surface 42B of the lower die 42 in the pressing direction of the punch 31 is preferably half of more of the thickness of the supporting member 44, and equal to or less than 10 times as large as the thickness of the exterior material 2. This is because the housing part 2W can be made closer to a cylindrical shape.

Figure 6:
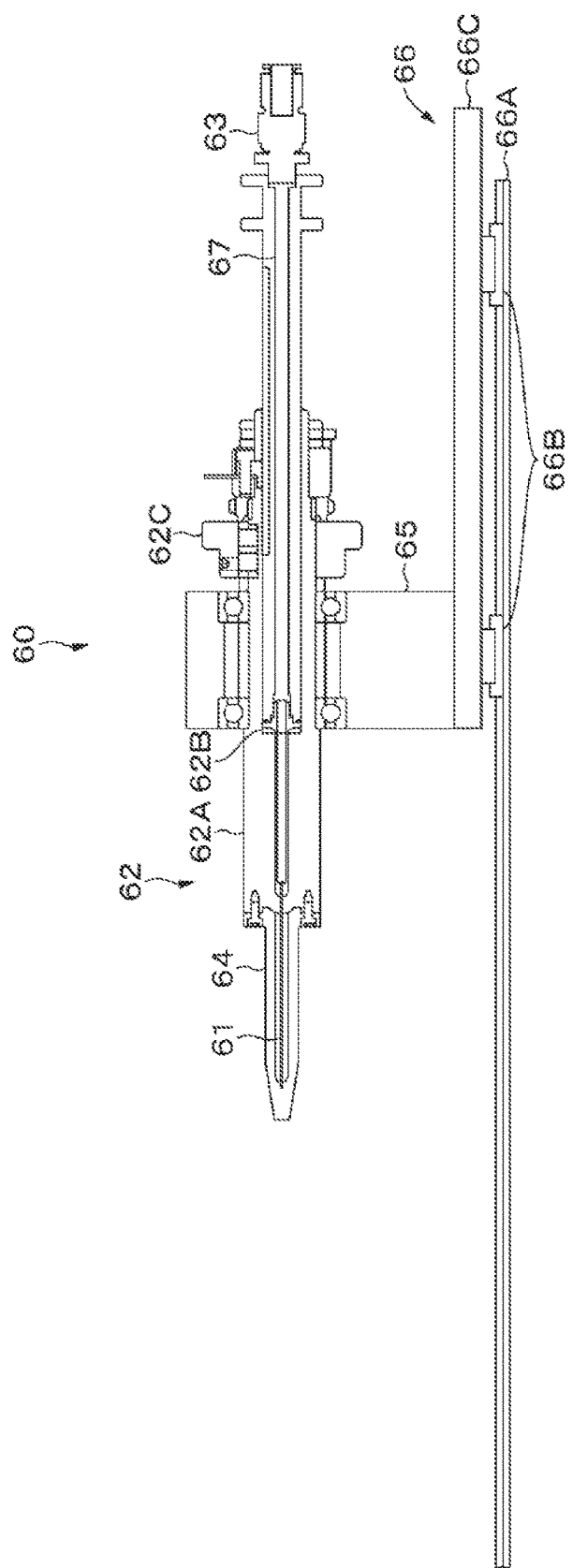
FIG. 6 is a diagram illustrating a configuration example of a winding device according to an embodiment.

Next, a configuration example of a winding device for use in the manufacture of the electrode body 1 according to an embodiment of the present technology will be described with reference to FIGS. 6, 7A, and 7B. FIG. 6 is a diagram illustrating a cross-section structure of a winding device 60, and FIGS. 7A and 7B are diagrams for explaining a shape example of a winding core 61.

The winding device 60 includes a winding shaft part 62 with the winding core 61, a connector 63 connected to a suction device, not shown, such as a decompression pump or a vacuum ejector, and a tip 64 in which the winding core 61 is housed, a pedestal 65 that supports the above-described configuration, and a support 66 that supports the winding shaft part 62 so as to be movable in the axial direction of the winding shaft part 62. The winding shaft 62 has a frame 62A that has an internal space, a winding shaft 62B housed in the frame 62A, and a driving part 62C that allows the winding shaft 62B to rotate. The support 66 has a transport table 66C supported by sliders 66B of a linear motor 66A, on which the pedestal 65 is supported.

Figure 7A:
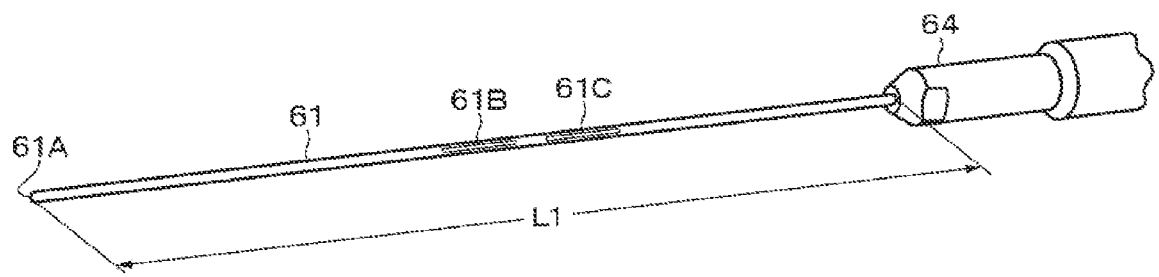
FIG. 7A is a diagram for illustrating a winding core according to an embodiment.
Figure 7B:
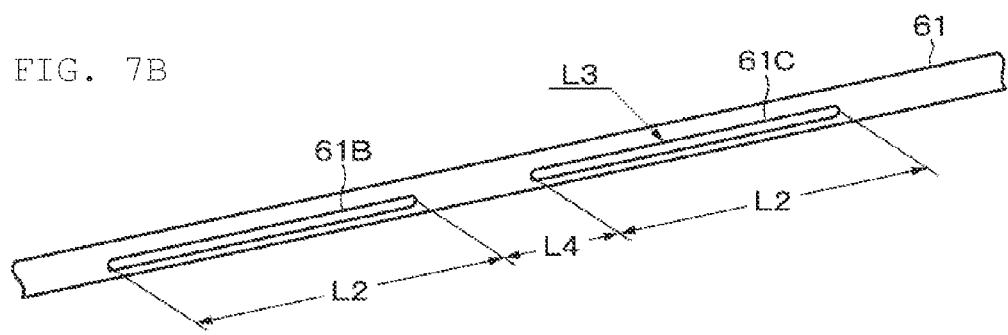
FIG. 7B is a diagram for illustrating an example of holes provided in the winding core.

As shown in FIG. 7A, the axial length L of the winding core 61 is, for example, approximately 50 mm to 80 mm, and set to be 75 mm in the present embodiment. The winding core 61 is made of, for example, stainless steel, a material containing cemented carbide, ceramic, or titanium. The winding core 61 is axially movable in the inside of the tip 64 in conjunction with the movement of the winding shaft 62B in accordance with the operation principle of the cylinder.

The winding core 61 has a cylindrical shape as a whole, and has a hollow cylindrical shape with a hollow (cavity) inside. In addition, a tip 61A which is one end of the winding core 61 is closed. The hollow of the winding core 61 is connected to a suction device via a cylindrical connecting member 67 provided inside the winding shaft 62B and the connector 63 connected to the connecting member 67.

The peripheral surface (outer peripheral surface) of the winding core 61 has a plurality of holes formed to be arranged in a row in the axial direction. For example, near the center of the winding core 61, two holes 61B and 61C are formed. According to the present embodiment, the holes 61B and 61C are arranged in a row, and specifically, arranged in only a row. The holes 61B and 61C are connected to the hollow of the winding core 61 by penetrating the winding core 61. The holes 61B and 61C have, for example, an elongate hole shape (elliptical shape). The axial lengths (longitudinal lengths) L2 of the holes 61B and 61C are, for example, 2 mm or more and 12 mm or less, and set to be 8 mm in the present embodiment. The lengths L3 of the holes 61B and 61C in the width direction (the lengths in the shorter-length direction) are set to be, for example, 0.2 mm or more, and the maximum value is set to be equal to or less than a chord length in a case where the central angle of the outside diameter of the winding core 61 is 90 degrees, or to be equal to or less than the inside diameter of the winding core 61. The distance L4 between the holes 61B and 61C (the length between the holes 61B and 61C) is, for example, 1 mm or more, and set to be 3 mm in the present embodiment.

Next, an example of a method for manufacturing a battery according to an embodiment of the present technology will be described with reference to FIGS. 5, 8A to 8D, and 9A to 9C.

Figure 8A:
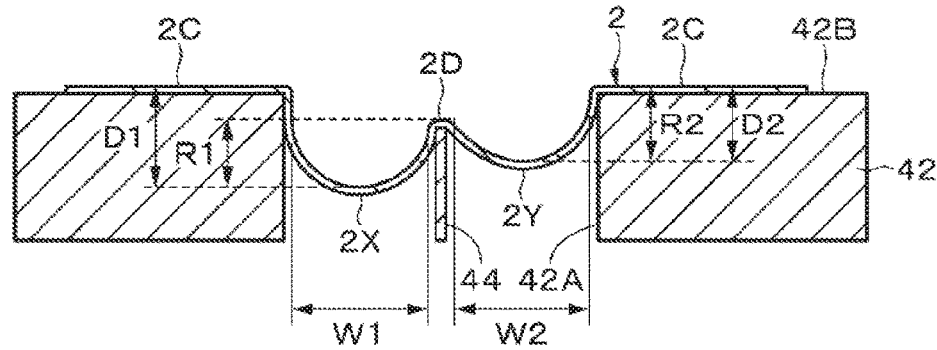
FIGS. 8A to 8D are each a process diagram for illustrating an example of a method for manufacturing a battery according to an embodiment of the present technology.

With the use of the deep drawing device shown in FIG. 5, the exterior material 2 is formed by embossing in the following way. First, the exterior material 2 is held between the placement surface 42B of the lower die 42 and the pressing surface 43B of the upper die 43. Next, the punch 31 is lowered and pushed into the hole 41A to press the inner surface (first surface) of the exterior material 2 with the molding parts 32 and 33, and the exterior material 2 is deformed while supporting the outer surface (second surface) with the supporting member 44 at the position of the boundary 34. When the molding parts 32, 33 are pushed to predetermined depths, the punch 31 is raised and pulled out from the hole 41A. Thus, as shown in FIG. 8A, the housing parts 2X and 2Y are formed in the exterior material 2.

In the "Step of Molding Exterior Material" mentioned above, the housing parts 2X and 2Y are molded so as to satisfy the relations of the following formulas (1A) to (3A), with the use of the punch 31 that satisfies the relations of the formulas (1a) to (3a) mentioned above.

$$D1 > D2 \tag{1A}$$

(in the formula (1A), D1 and D2 respectively represent the depths of the housing parts 2X and 2Y, with the inner surfaces of the peripheral edges 2A, 2B, and 2C as baselines.)

$$R1 = R2 \tag{2A}$$

(in the formula (2A), R1 and R2 respectively represent the radii of the housing parts 2X and 2Y.)

$$W1 = W2 \tag{3A}$$

(in the formula (3A), W1 and W2 respectively represent the widths of the housing parts 2X and 2Y.)

In the "Step of Molding Exterior Material" mentioned above, the housing parts 2X and 2Y may be molded so as to satisfy the relations of the following formulas (1B) to (3B), with the use of the punch 31 that satisfies the relations of the formulas (1b) to (3b) mentioned above.

$$D1 > D2 \tag{1B}$$

$$R1 > R2 \tag{2B}$$

$$W1 > W2 \tag{3B}$$

In the "Step of Molding Exterior Material" mentioned above, the boundary 34 of the punch 31 and the top of the supporting member 44 are preferably narrow in width. Thus, the distance between the housing parts 2X and 2Y can be reduced, thereby making it possible to seal the electrode body 1 in the exterior material 2, without causing the folded back part 2D of the exterior material 2 to protrude with respect to the peripheral surface of the housing part 2W. Thus, the housing part 2W can be made closer to a cylindrical shape.

Figure 8B:
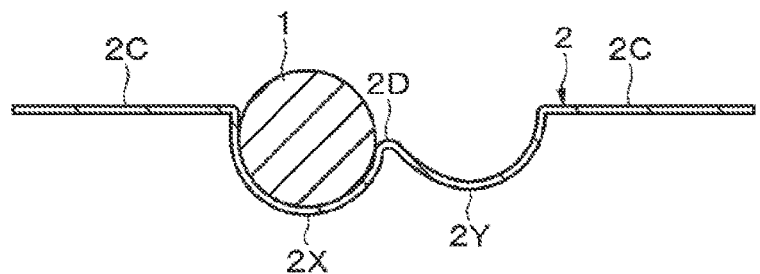
Figure 8C:
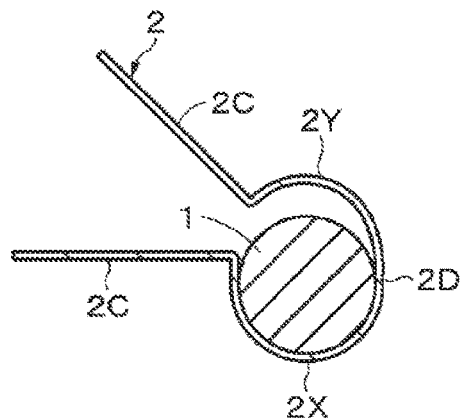
Figure 8D:
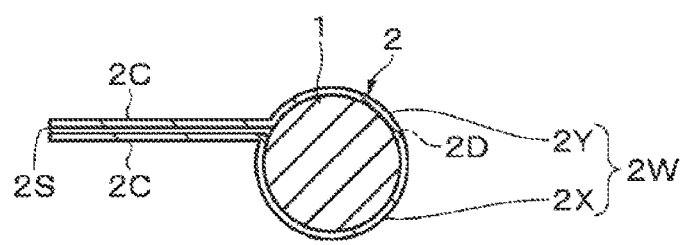

In the following way, the electrode body 1 is subjected to scaling with the exterior material 2 by sealing three sides of the periphery of the housing part 2W except the folded back part 2D at the peripheral surface. First, as shown in FIG. 8B, the electrode body 1 with the positive electrode lead 3 and the negative electrode lead 4 attached thereto is housed in the housing part 2X which is larger in depth, of the housing parts 2X, 2Y. Next, as shown in FIG. 8C, the exterior material 2 is folded back at the folded back part 2D between the housing parts 2X and 2Y, and as shown in FIG. 8D, the housing part 2W is formed by overlapping the peripheral edges 2A, 2B, 2C surrounding the three sides at the both end surfaces and the peripheral surface (side surface), of the peripheries of the housing parts 2X, 2Y, and combining the housing parts 2X, 2Y. In this regard, preferably, the sealant material 5A is disposed between the positive electrode lead 3 and the exterior material 2, and the sealant material 5B is disposed between the negative electrode lead 4 and the exterior material 2.

Figure 9A:
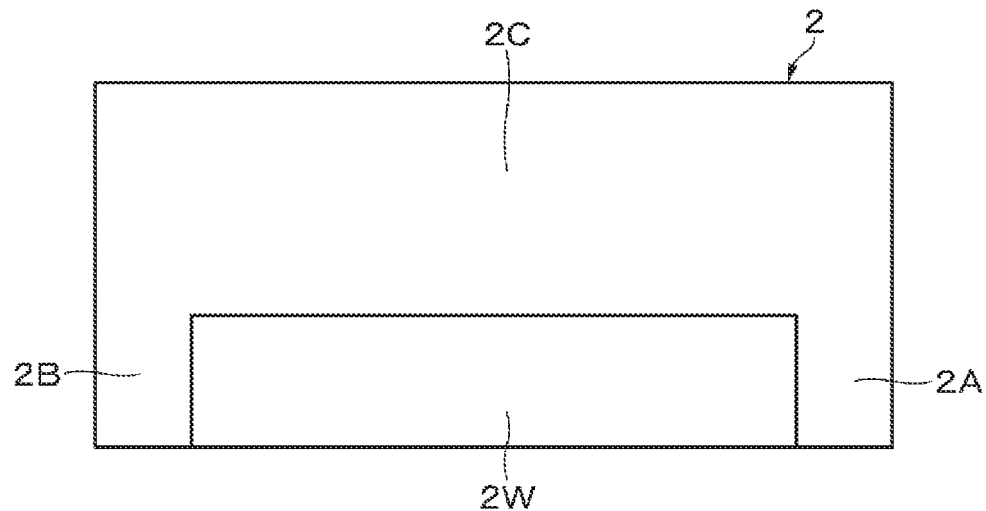
FIGS. 9A to 9C are each a process diagram for illustrating an example of a method for manufacturing a battery according to an embodiment of the present technology.

Next, as shown in FIG. 9A, the peripheral edges 2A, 2B overlapped at the both end surfaces of the housing part 2W are sealed with each other by thermal fusion or the like, thereby forming the sealed parts 2P, 2Q at the both end surfaces of the housing part 2W, and forming an opening 2S at the peripheral surface of the housing part 2W (see FIG. 8D). Next, an electrolytic solution is injected into the exterior material 2 through the opening 2S. Hereinafter, the electrode body 1 housed in the exterior material 2 under such a condition is referred to as a battery precursor.

Figure 9B:
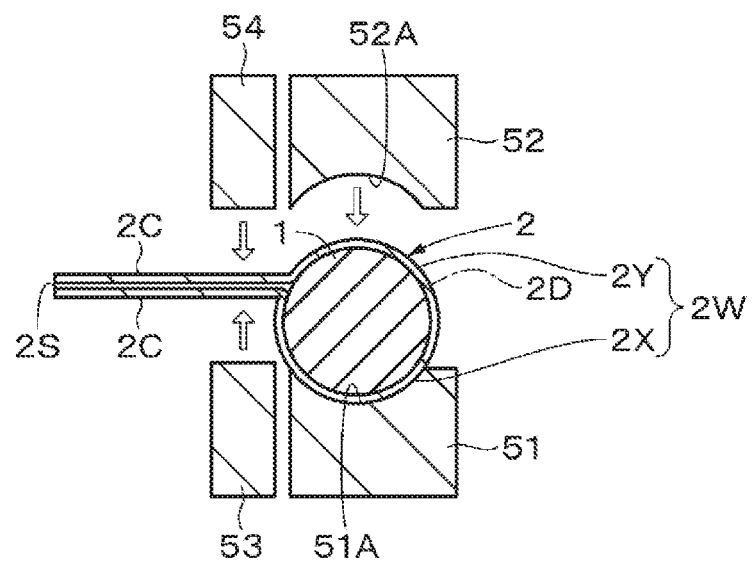

Next, as shown in FIG. 9B, the battery precursor is held by recesses 51A and 52A of molds 51 and 52. The recesses 51A and 52A each have a substantially partial cylindrical shape with a radius substantially similar to those of the housing part 2X and the housing part 2Y. Next, the battery precursor held by the molds 51, 52 is transported into a vacuum chamber, not shown, and fixed at a predetermined position.

Next, while exhausting the inside of the vacuum chamber, the opening 2S (that is, the peripheral edges 2C, 2C) are sandwiched from both sides thereof by heating blocks 53 and 54 as heating means provided in the vacuum chamber, and the opening 2S is sealed by thermal fusion or the like to form a sealed part 2R. Thus, the sealed part 2R can be formed while exhausting the inside of the exterior material 2. In the formation of the sealed part 2R, the heating block 53, 54 preferably sandwiches the opening 2S from the both sides thereof to apply tension to the exterior material 2, and then bring the exterior material 2 into close contact with the electrode body 1, such that the folded back part 2D is kept from protruding with respect to the peripheral surface of the housing part 2W. This is because the adhesion of the exterior material 2 with respect to the electrode body 1 can be enhanced to make the housing part 2W closer to a cylindrical shape.

Figure 9C:
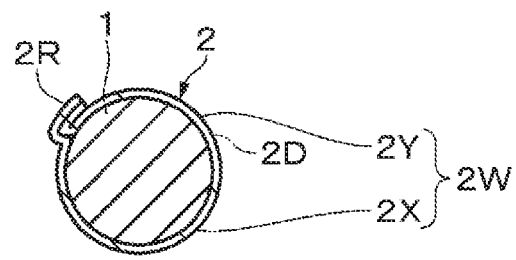

Next, if necessary, the sealed part 2R is cut to leave a predetermined width, and then, as shown in FIG. 9C, the sealed part 2R and the peripheral surface of the housing part 2W may be bonded to each other by thermal fusion or the like such that the sealed part 2R follows the peripheral surface of the housing part 2W, thereby fixing the sealed part 2R. Fixing the sealed part 2R as just described can make the peripheral surface of the battery a shape closer to a cylindrical surface, thereby further reducing the size of the entire battery.

In the battery according to one embodiment, the sealed parts 2P, 2Q located to stand substantially perpendicular to the end surfaces of the housing part 2W are provided to deviate from the centers of the end surfaces of the housing part 2W, thus making it possible to expand the housing spaces at the end surfaces of the housing part 2W. Accordingly, in consideration of the configuration including circuit members, the volumetric efficiency of the entire battery can be improved. Thus, a battery can be provided which is preferred for application to portable devices, wearable devices, and the like. In this regard, the housing space at the end surface of the housing part 2W means a substantially partial cylindrical space formed by virtually extending one end surface of the housing part 2X from the position thereof to the tip end position of the sealed part 2P.

The exterior material 2 is folded back at the folded back part 2D to provide the electrode body 1 sealed in the folded back exterior material 2, thus allowing the sealed part 2R to be provided at a single site on the peripheral surface of the electrode body 1. Thus, the volumetric efficiency of the battery can be improved.

In a case where the sealed part 2R is provided to follow the substantially cylindrical peripheral surface of housing part 2W, and in a case where the folded back part 2D is provided without protruding with respect to the peripheral surface of housing part 2W, the peripheral surface of the battery can be made a shape closer to a cylindrical surface. Thus, the volumetric efficiency of the battery can be further improved.

Next, an example of a method for manufacturing the electrode body 1 according to the embodiment of the present technology will be described.

First, the overall flow of the manufacturing method will be described with reference to FIGS. 10A to 10F. In the following description, the left side in the figure is referred to as the front, and the movement to the front is referred to as a forward movement. Further, the right side in the figure is referred to as the rear, and the movement to the rear is referred to as a backward movement.

Figure 10A:
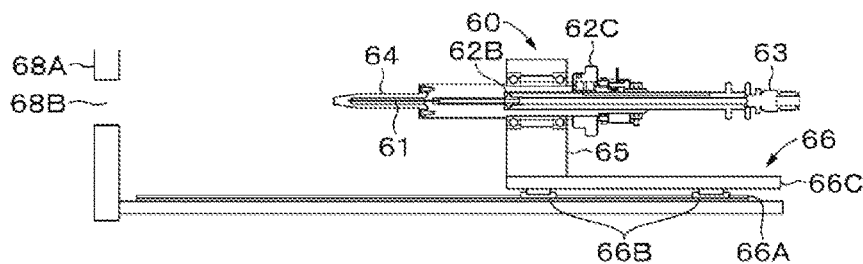
FIGS. 10A to 10F. are each a process diagram for illustrating an example of a method for manufacturing an electrode body according to an embodiment of the present technology.
Figure 10B:
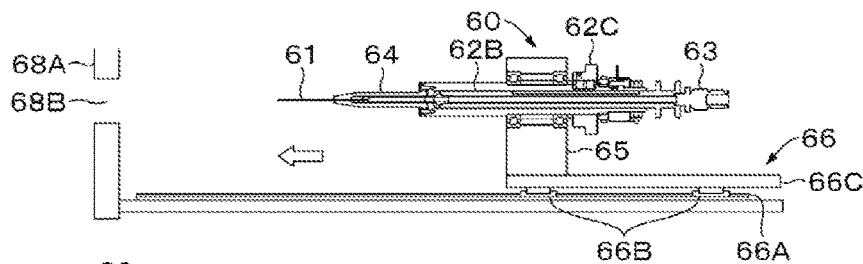

As shown in FIG. 10A, the winding device 60 is located at a predetermined initial position. In front of the winding device 60, a base 68A is located, and the base 68A has an opening 68B formed. A winding core receiver 68C is provided at a predetermined position in front of the base 68A. The operation of a drive device, not shown, for the winding device 60 located at the initial position causes the winding shaft 62B to temporarily move backward. Next, as shown in FIG. 10B, the winding shaft 62B moves forward. The forward movement of the winding shaft 62B causes the winding core 61 to move forward toward the outside of the tip 64 in conjunction with the movement of the winding shaft 62B in accordance with the principle of the cylinder.

Figure 10C:
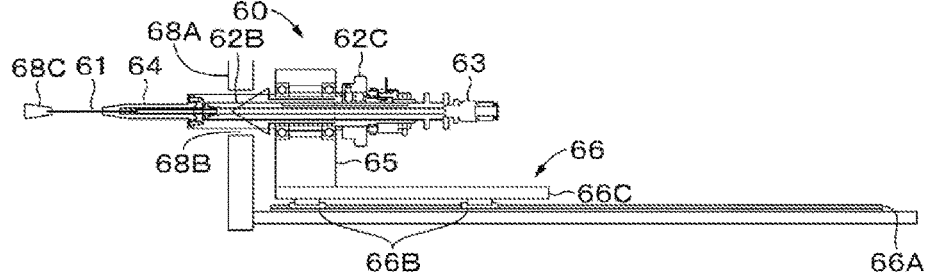

Subsequently, as shown in FIG. 10C, the linear motor 66A of the support 66 is driven, thereby causing the transport table 66C supported by the slider 66B to move forward. Thus, the respective components on the pedestal 65 move forward, thereby causing the winding core 61 to move to the outside of the base 68A through the opening 68B, and inserting the tip of the winding core 61 into the winding core receiver 68C. It is to be noted that the transport speed of the transport table 66C is preferably decreased immediately before the tip of the winding core 61 is inserted into the winding core receiver 68C. Thus, the load can be reduced, which is applied to the winding core 61 when the tip of the winding core 61 is inserted into the winding core receiver 68C.

Figure 10D:
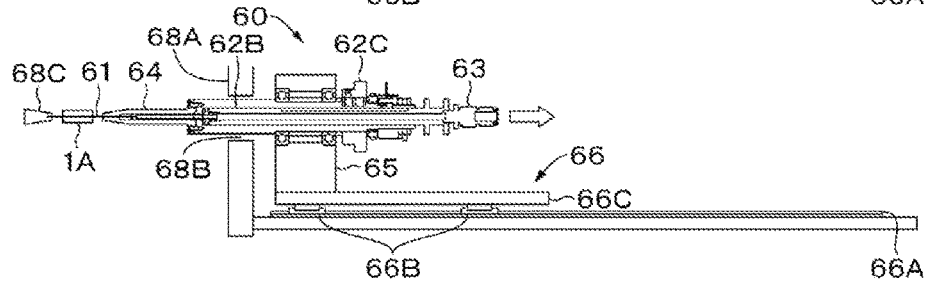
Figure 10E:
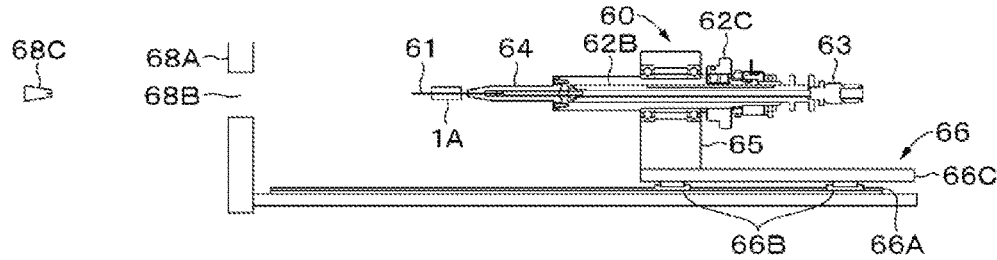
Figure 10F:
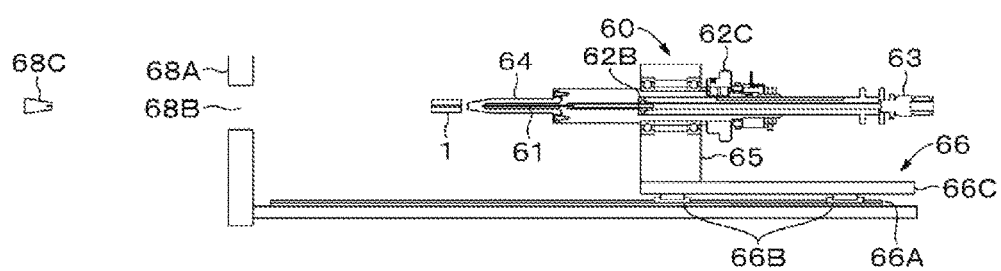

Subsequently, a winding process is performed as in FIG. 10D, thereby preparing the wound body 1A. Although the details of the winding process will be described later, roughly, the suction device connected to the connector 63 operates to suction and hold the separator in the holes 61B and 61C of the winding core 61. With the separator suctioned in the winding core 61, the positive electrode and the negative electrode are wound around the winding core 61, thereby forming the wound body 1A. Subsequently, after the operation of the suction device is stopped, as shown in FIG. 10E, the linear motor 66A of the support 66 is driven, thereby causing the transport table 66C supported by the sliders 66B to move backward. Then, as shown in FIG. 10F, the electrode body 1 is obtained by pulling out the winding core 61 from the wound body 1A by the backward movement of the winding shaft 62B while blowing air from the rear toward the front (air blow).

Next, the flow of the winding process will be described with reference to FIGS. 11A to 11G. It is to be noted that in FIGS. 11A to 11G, respective components simplified are shown in order to prevent complicated illustration, but the respective components are connected to appropriate driving devices or supporting devices.

In FIGS. 11A to 11G, reference numerals 71 72, and 73 respectively denote one strip-shaped separator, a positive electrode, and a negative electrode. In addition, reference numeral 81 denotes a separator slide roller, reference numeral 82 denotes a first slide roller, reference numeral 83 denotes a first nip roller, reference numeral 84 denotes a second slide roller, reference numeral 85 denotes a second nip roller, reference numeral 86 denotes a first separator chuck, reference numeral 87 denotes a cutter blade, and reference numeral 88 denotes a second separator chuck. Further, the separator 71 has one end (for example, an upper side in FIG. 11) supported by a support roller or the like, not shown, and the other end (for example, lower side in FIG. 11) supported by the second separator chuck 88 which is capable of moving up and down.

The separator 71 is pulled out by lowering the second separator chuck 88 supporting the other end of the separator 71, from the condition with the respective components positioned at the initial positions. Then, as shown in FIG. 11A, the separator slide roller 81 moves forward to come into abutment with the separator 71, thereby applying certain tension to the separator 71. Then, as shown in FIG. 11B, after the first slide roller 82 moves and presses the separator 71 against the winding core 61, the separator slide roller 81 retracts to the initial position. Then, the suction device connected to the connector 63 operates to suction the separator 71 in the core 61 via the holes 61B and 61C.

The site of the separator 71, which is pressed against the winding core 61 and suctioned by the winding core 61, is preferably a middle part of the separator 71. The middle part of the separator 71 is a part at or near the center in the longitudinal direction of the separator 71, in a case where the separator 71 is wound in the longitudinal direction and then cut.

Then, as shown in FIG. 11C, the second slide roller 84 is moved forward to come into abutment with the separator 71. Thus, the preparation is completed for nipping the positive electrode 72 and the negative electrode 73. In this regard, the separator 71 may be wound up about once. It is to be noted that he surface of the separator 71 in abutment with the first and second slide rollers 82 and 84 is the opposite surface.

Next, as shown in FIG. 11D, the positive electrode 72 and the negative electrode 73 are supplied by a feeding device, not shown. The positive electrode 72 and the negative electrode 73 are cut in advance to a predetermined length. The positive electrode 72 is disposed on one main surface of the separator 71, and the negative electrode 73 is disposed on the other main surface of the separator 71. In a case where a gel-like substance (gel electrolyte layer) is provided on the surfaces of the positive electrode 72 and the negative electrode 73, the positive electrode 72 and the negative electrode 73 are bonded to the respective main surfaces of the separator 71.

Then, after the separator 71, the positive electrode 72, and the negative electrode 73 are started to be wound up, as shown in FIG. 11E, the winding is continued while releasing the first and second slide rollers 82 and 84. It is to be noted that the second separator chuck 88 is raised in accordance with the winding. After a certain amount of winding is completed, as shown in FIG. 11F, the first separator chuck 86 is moved to a predetermined position, and then, the separator 71 is supported by the first separator chuck 86. Then, the cutter blade 87 is moved by a driving device, not shown, thereby cutting the separator 71. Then, after releasing the support of the separator 71 by the first and second separator chucks 86 and 88, the winding core 61 is rotated, thereby winding up the remaining separator 71. Thus, the wound body 1A is prepared. Then, after releasing the suction of the wound body 1A by the winding core 61, the winding core 61 is pulled out from the wound body 1A obtained, thereby providing the electrode body 1.

Further, as shown in FIG. 11G, the wound body 1A obtained may be subjected to a press process of pressing with the first and second slide rollers 82 and 84 in order to improve the wettability of the electrode body 1 and shape the electrode body 1.

According to the embodiment described above, the electrode body is prepared by winding up the separator, the positive electrode, and the negative electrode while suctioning the middle part of the separator with the winding core, and the electrode body can be thus provided to have a round shape.

Figure 12:
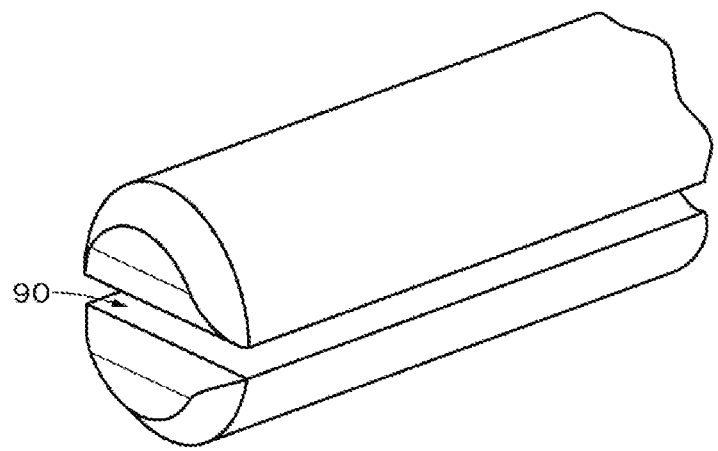
FIG. 12 is a diagram for explaining a configuration example of a split winding core.

In this regard, it is also conceivable ta make the shape of the winding core according to the embodiment described above (hereinafter, which may be referred to as a suction winding core) into a shape divided by a continuous cut (slit) 90 (hereinafter, this shape may be referred to as a split winding core), as shown in FIG. 12, and suction the separator with the cut 90. This shape has, however, a problem that the separator penetrates into the cut 90, thereby generating a wrinkle. In addition, there is a problem that the adhesion between the separator and the winding core is decreased due to the wrinkle, thereby causing the winding core to run idle, there is a problem that the separator is caught in pulling out the winding core from the electrode body, or there is a possibility that the separator located at the innermost periphery may be scratched. In addition, there is a possibility that the wrinkle may increase the diameter of the electrode body. The winding core according to an embodiment has, however, a plurality of holes spaced apart, thus decreasing the possibility of the separator may be suctioned into the holes. Accordingly, even in a case where the battery is reduced in size or the like, the winding property in the preparation of the electrode body can be improved while securing the strength of the winding core.

While the embodiment of the present technology have been concretely described above, the present technology is not to be considered limited to the embodiment described above, and it is possible to make various modifications based on technical idea of the present technology.

The shapes of the holes 61B and 61C may be rectangular elongate holes. In addition, the present technology can also be applied to the preparation of batteries other than lithium ion secondary batteries.

The configurations, methods, steps (manufacturing process), shapes, materials, numerical values, and the like cited in the above-described embodiment are considered by way of example only, and configurations, methods, steps (manufacturing process), shapes, materials, and numerical values may be used which are different from the foregoing, if necessary. In addition, the present technology can also be applied to secondary batteries other than lithium ion secondary batteries, and even primary batteries. In addition, the battery prepared by the manufacturing method according to the present technology can be applied to various electronic devices (for example, portable electronic devices such as a smartphone and a portable audio player).

EXAMPLES

Next, examples of the present technology will be described, but the present technology is not to be considered limited to the following examples.

Figure 13:
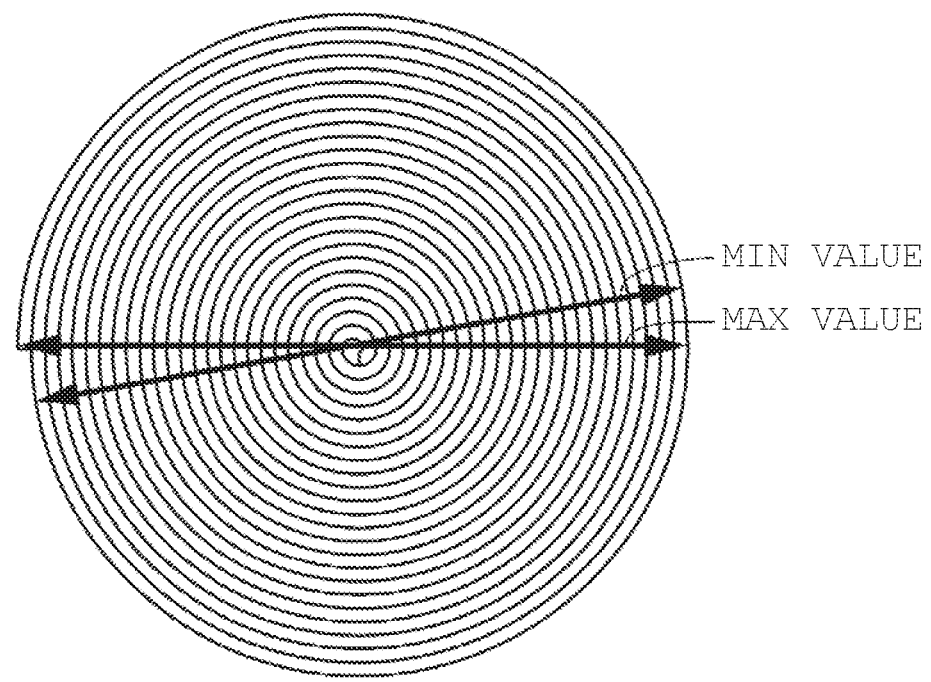
FIG. 13 is a diagram for illustrating an example of roundness.

Here are separators used in the examples.

microporous membrane of PE single layer thickness: 10 µm; width (length in shorter-length direction): 30 mm; basis weight: 5.6 g/m$^2$; air permeability: 200 sec/100 ml Here are evaluation items in the examples. As shown in FIG. 13, the "roundness" was specified by the ratio (MIN value/MAX value) of the minimum value of the outside diameter of the electrode body to the maximum value (MAX value) thereof, in such a way that the maximum value (MAX value) and minimum value (MIN value) of the outside diameter of the electrode body were measured with a measuring instrument. A digimatic indicator (manufactured by Mitutoyo Corporation, model number: ID-S112X) was used as the measuring instrument.

Figure 14:
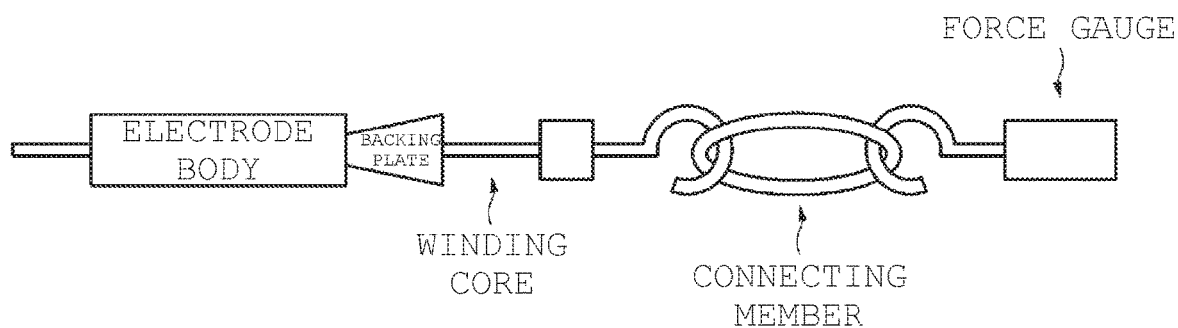
FIG. 14 is a diagram for illustrating an example of a method for evaluating winding core pulling.

The "winding core pulling" was evaluated by the method shown in FIG. 14. As shown in FIG. 14, the winding core is connected to a force gauge with a connecting member, with a backing plate in abutment with the prepared electrode body in the pull-out direction, and the force [N] required for pulling out the winding core from the electrode body was measured with the force gauge.

Figure 15:
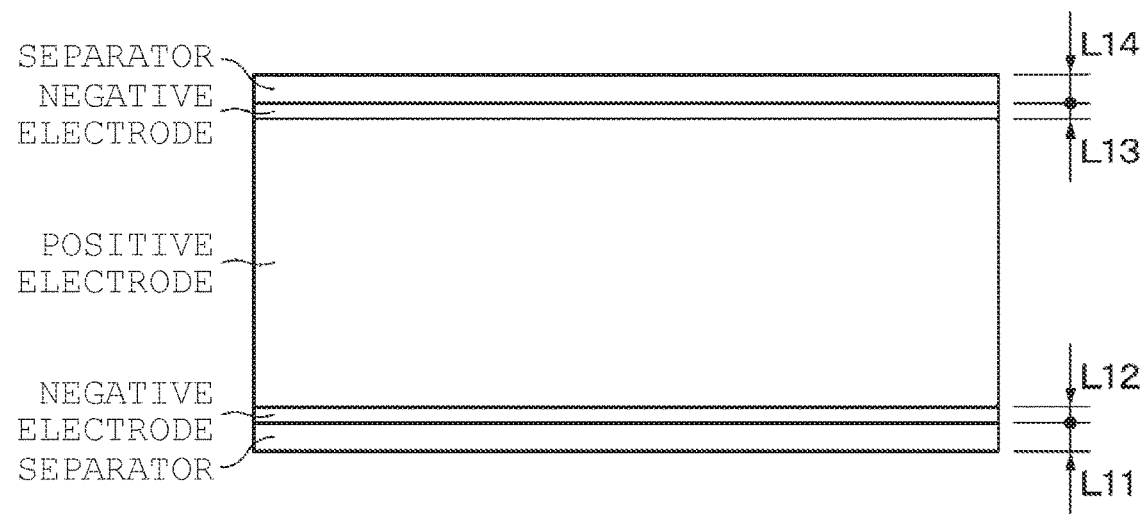
FIG. 15 is a diagram for illustrating an example of a winding deviation.

As for the "winding deviation", the electrode body that failed to satisfy any of the following conditions was identified as having a winding deviation. As shown in FIG. 15, among the obtained electrode bodies, the electrode body that failed to satisfy any of: the condition that the minimum value of the clearance between the separator and the negative electrode was 0.25 mm or more; and the condition that the minimum value of the clearance between the positive electrode and the negative electrode was 0.1 mm or more, was identified as having a deviation.

The positive electrodes were prepared as follows. First, lithium carbonate ($Li_2CO_3$) and cobalt carbonate ($CoCO_3$) were mixed at a molar ratio of 0.5:1, and then subjected to firing in air at 900° C. for 5 hours, thereby providing a lithium cobalt composite oxide ($LiCoO_2$). Next, 91 parts by mass of the lithium cobalt composite oxide obtained in the way described above, 6 parts by mass of graphite as a conducting agent, and 3 parts by mass of polyvinylidene fluoride as a binder were mixed, thereby providing a positive electrode combination, and the positive electrode combination was then dispersed in N-methyl-2-pyrrolidone to provide a paste-like positive electrode combination slurry. Next, the positive electrode combination slurry was applied to both surfaces of a positive electrode current collector made from strip-shaped aluminum foil (12 μm thick), dried, and then subjected to compression molding by a roll press machine, thereby forming a positive electrode active material layer.

A negative electrode was prepared as follows. First, 97 parts by mass of an artificial graphite powder as a negative electrode active material and 3 parts by mass of polyvinylidene fluoride as a binder were mixed to provide a negative electrode combination, and the negative electrode combination was dispersed in N-methyl-2-pyrrolidone to provide a paste-like negative electrode combination slurry. Next, the negative electrode combination slurry was applied to both surfaces of a negative electrode current collector made from strip-shaped copper foil (15 μm thick), dried, and then subjected to compression molding by a roll press machine, thereby forming a negative electrode active material layer.

Then, after the preparation of an electrode body by a method similar to the method described with reference to the embodiment, a battery was prepared.

First, an electrode body was evaluated which was obtained in the case of changing the shape and outside diameter of the winding core, and the winding start position of the separator. The outside diameter of the electrode body was set to the maximum value of the outside diameter. The electrode body was prepared by winding a positive electrode (240 mm), a negative electrode (210 mm), and a separator (205 mm (double length of 410 mm in total length)). The deflection of the winding core is the amount of deflection of the winding core in the case of applying a tension of 50 g to the separator and winding up the separator together with the positive electrode and the negative electrode. The length of the winding core was set to be 75 mm, the length of the hole (elongate hole) was set to be 8 mm, the width of the hole was set to be 0.2 mm, the distance between the holes was set to be 3 mm, and the number of holes was set to be 2. The number of samples N for each sample was adjusted to N=10. The results are shown in Table 1.

TABLE 1

| Sample | Outside Diameter of Winding Core | Winding Core | Winding Start Position of Separator | Separator Length at Start of Winding [mm] | Outside Diameter of Electrode Body [mm] | Deflection of Winding Core [mm] | Winding Deviation Defect Rate | 1-Roundness |
|---|---|---|---|---|---|---|---|---|
| 1-1 | φ2.0 | Suction Winding Core | Middle | 6.3 | 9.118 | 0.002 | 0% | 0.007 |
| 1-2 | | Split Winding Core | Middle | 8.3 | 9.119 | 0.013 | 0% | 0.030 |
| 1-3 | | Split Winding Core | End | 16.3 | 9.124 | | | |
| 2-1 | φ1.5 | Suction Winding Core | Middle | 4.8 | 9.036 | 0.005 | 0% | 0.008 |
| 2-2 | | Split Winding Core | Middle | 6.3 | 9.037 | 0.046 | 10% | 0.040 |
| 2-3 | | Split Winding Core | End | 13.8 | 9.041 | | | |
| 3-1 | φ1.0 | Suction Winding Core | Middle | 3.2 | 8.980 | 0.027 | 0% | 0.008 |
| 3-2 | | Split Winding Core | Middle | 4.2 | 8.981 | 0.231 | 50% | 0.040 |
| 3-3 | | Split Winding Core | End | 11.2 | 8.984 | | | |
| 4-1 | φ0.8 | Suction Winding Core | Middle | 2.6 | 8.965 | 0.065 | 0% | 0.010 |
| 4-2 | | Split Winding Core | Middle | 3.4 | 8.966 | 0.374 | Winding Core Breakage | |
| 4-3 | | Split Winding Core | End | 10.2 | 8.969 | | | |

TABLE 1-continued

| Sample | Outside Diameter of Winding Core | Winding Core | Winding Start Position of Separator | Separator Length at Start of Winding [mm] | Outside Diameter of Electrode Body [mm] | Deflection of Winding Core [mm] | Winding Deviation Defect Rate | 1-Roundness |
|---|---|---|---|---|---|---|---|---|
| 5-1 | φ0.5 | Suction Winding Core | Middle | 1.6 | 8.951 | 0.455 | 10% | 0.010 |
| 5-2 | | Split Winding Core | Middle | 2.1 | 8.952 | 0.733 | Winding Core Breakage | |
| 5-3 | | Split Winding Core | End | 8.6 | 8.954 | | | |

In the case of the split winding core of 1.5 mm or less in the outside diameter of the winding core, it has been confirmed that, the significant deflection of the winding core produced a winding deviation or broke the winding core. In addition, in the case of the split winding core of 2.0 mm or less in the outside diameter of the winding core, it has been confirmed that the roundness was decreased, although no winding deviation was produced. In the suction winding cores shown in Samples 1-1, 2-1, 3-1, and 4-1, the roundness was as high as 0.99 or more, without any winding deviation produced. In the case of the suction winding core of Sample 5-1, it has been confirmed that a winding deviation of 10% was produced. From the above, it has been confirmed that the outside diameter of the winding core is preferably 0.8 to 2 mm, and more preferably 1.0 to 2 mm from the viewpoint of roundness.

Next, the suction power was measured with changes in the shape of the suction part (hole) formed in the winding core. For Sample 6, the shape of the suction part was made into an elongate hole, as with the holes according to the embodiment. The number of elongate holes was adjusted to two, the width of each elongate hole was adjusted to 0.2 mm, and the length of each elongate hole was adjusted to 8 mm in the longitudinal direction. The distance between the elongate holes was adjusted to 1 mm or more, and set to 3 mm in this example. The outside diameter of the winding core was adjusted to 2 mm. For Sample 7, the shape of the suction part was adjusted to a porous type. Thirty-two holes of 0.25 mm in diameter (φ) were formed in the winding core at a pitch of 0.5 mm. For Samples 8 and 9, the shapes of the suction parts were made porous. For Sample 8, the entire periphery of the winding core was made porous. For Sample 9, apart corresponding to a chord length for a central angle of 90 degrees with the outside diameter of the winding core was made porous. The results are shown in Table 2.

TABLE 2

Comparison of Elongate Hole of Suction Part with other Holes

| Sample | Shape of Suction Part | Dimensions of Suction Part | Suction Power Measurement Result |
|---|---|---|---|
| 6 | Elongate Hole | 0.2 mm × 8 mm at two sites | 2N |
| 7 | Porous Type | φ0.25 mm × 32 holes, pitch: 0.5 mm | Zero (no suction) |
| 8 | Porous | Entire Periphery | Zero (no suction) |
| 9 | Porous | 90 degrees | Zero (no suction) |

From the results shown in Table 2, in the case of Sample 6, suction power of 2 N was measured. In the case of samples 7 to 9, it has been confirmed that the suction power was 0 (no suction). Thus, the shape of the suction part is preferably an elongate hole.

Next, with changes in the diameter of the suction winding core, the samples were evaluated for each of the winding deviation, roundness, and winding core pulling. In addition, the outside diameter of the electrode body to be prepared was set to 8 mm. The shape of the suction part was made an elongate hole, the length of the elongate hole was set to 8 mm, and the width of the elongate hole was set to 0.2 mm, and each of the samples was evaluated. The number of elongate holes was adjusted to two, and the distance between the elongate holes was set to 3 mm. The number of samples N for each sample was set to N=10. The results are shown in Table 3.

TABLE 3

| Sample | Winding Core Diameter (Outside Diameter/Inside Diameter) [mm] | Winding Deviation | Outside Diameter Ratio [MIN/MAX] (Roundness) | Winding Core Pulling [N] |
|---|---|---|---|---|
| 10 | φ0.3/φ0.15 | Winding Core Breakage | | |
| 11 | φ0.5/φ0.3 | 10% | 0.998 | 10.2 |
| 12 | φ0.8/φ0.5 | 0% | 0.9987 | 12.3 |
| 13 | φ1.0/φ0.7 | 0% | 0.999 | 15.3 |
| 14 | φ1.5/φ1.0 | 0% | 0.999 | 22.4 |
| 15 | φ2.0/φ1.0 | 0% | 0.9991 | 25.3 |
| 16 | φ3.0/φ1.0 | 0% | 0.9995 | 34 |

Separator Width: 30 mm

Electrode Body Outside Diameter: φ8 mm

Suction Hole Length: 8 mm

Suction Hole Width: 0.2 mm

Suction Hole-to-Suction Hole Distance: 3 mm

The Number of Suction Holes: 2

The Number of Samples: 10

In addition, in a similar manner, with changes in the outside diameter of the split winding core, the samples were evaluated for each of the winding deviation, roundness, and winding core pulling. The results are shown in Table 4.

TABLE 4

| Sample | Winding Core Diameter (Outside Diameter/ Inside Diameter) [mm] | Winding Deviation | Outside Diameter Ratio [MIN/MAX] (Roundness) | Winding Core Pulling [N] |
|---|---|---|---|---|
| 17 | φ0.3 mm Split Winding Core | Winding Core Breakage | | |
| 18 | φ0.5 mm Split Winding Core | Winding Core Breakage | | |
| 19 | φ0.8 mm Split Winding Core | Winding Core Breakage | | |
| 20 | φ1.0 mm Split Winding Core | Winding Core Breakage | | |
| 21 | φ1.5 mm Split Winding Core | 60% | 0.95 | 32 |
| 22 | φ2.0 mm Split Winding Core | 20% | 0.975 | 45 |
| 23 | φ3.0 mm Split Winding Core | 0% | 0.9875 | 73 |

As shown in Table 3, in the case of Sample 10, it has been confirmed that the winding core was broken. In addition, in the case of Sample 11, it has been confirmed that a winding deviation was produced in 10% of all of the samples. It has been confirmed that no winding deviation was produced when the outside diameter of the winding core was 0.8 mm or more, whereas the inside diameter of the winding core was 0.5 mm or more. In addition, the roundness of 0.99 or more has been confirmed. In the case of sample 16, however, it has been confirmed that the winding core pulling was increased to 34 N. Thus, the outside diameter of the winding core is preferably 2 mm or less.

As shown in Table 4, in the case of Samples 17 to 22, it has been confirmed that the winding core was broken, with a winding deviation produced. In addition, in the case of Sample 23, although no winding deviation was produced, the roundness was decreased, and the winding core pulling was 73 N, and it has been confirmed that a large force is required for pulling out the winding core.

Next, with changes in the length of the elongate hole constituting the suction part, the number of elongate holes, the distance between the elongate holes, and the ratio of the total length of the elongate holes (the total of the lengths of the elongate holes) to the width of the separator, the suction power was measured to evaluate samples for suction availability. The width of the separator was set to 30 mm, and the outside diameter of the electrode body to be prepared was set to 8 mm. The outside diameter of the winding core was set to 1 mm, and the inside diameter of the winding core was set to 0.7 mm. The width of the elongate hole was set to 0.2 mm. The number of samples N for each sample was set to N=10. The suction power was evaluated as "x (failure)" in the case of the suction power of 0 N, "Δ (acceptable)" in the case of the suction power of 0 to less than 1 N, or "○ (favorable)" in the case of the suction power of 1 N or more (the same applies to Example 5 described later). The results are shown in Table 5.

TABLE 5

| Sample | Suction Hole Length [mm] | The Number of Holes | Suction Hole-to-Suction Hole Distance [mm] | Suction Availability | Ratio (Total Hole Length/ Separator Width) [%] | Suction Power [N] |
|---|---|---|---|---|---|---|
| 25 | 12.0 | 2.0 | 2.0 | ○ | 80.0 | 2.6 |
| 26 | 10.0 | 2.0 | 4.0 | ○ | 66.7 | 2.4 |
| 27 | 8.0 | 2.0 | 8.0 | ○ | 53.3 | 2.0 |
| 28 | 6.0 | 3.0 | 3.0 | ○ | 60.0 | 2.3 |
| 29 | 5.0 | 2.0 | 14.0 | ○ | 33.3 | 1.3 |
| 30 | 4.0 | 2.0 | 16.0 | Δ | 26.7 | 0.7 |
| 31 | 3.0 | 2.0 | 18.0 | x | 20.0 | 0.0 |
| 32 | 3.0 | 3.0 | 7.5 | ○ | 30.0 | 1.2 |
| 33 | 2.0 | 4.0 | 5.3 | Δ | 26.7 | 0.6 |

Separator Width: 30 mm
Electrode Body Outside Diameter: φ8 mm
Winding Core Outside Diameter: φ1.0 mm
Winding Core Inside Diameter: φ0.7 mm
Suction Hole Width: 0.2 mm
The Number of Samples: 10

As shown in Table 5, in the case of Sample 31, it has been confirmed that the suction power was 0 (no suction). In the case of Samples 30 and 33, it has been confirmed that the suction power was as low as less than 1N, although the suction parts worked. From the results shown in Table 5, it has been confirmed that the ratio of the total length of the elongate holes to the width of the separator is preferably more than 20%, more preferably 30% or more, and preferably 80% or less. In addition, it has been confirmed that the distance between the holes in the axial direction of the winding core is preferably 2 mm or more and half or less of the separator width.

Next, samples were evaluated for the availability of suction and the presence or absence of winding deviation in changing the width of the elongate hole constituting the suction part. The width of the separator was set to 30 mm, and the outside diameter of the electrode body to be prepared was set to 8 mm. The inside diameter of the winding core was set to 0.7 mm. The length of the elongate hole (suction hole) was set to 8 mm. The number of elongate holes was set to 2, and the distance between the elongate holes was set to 3 mm. The number of samples N for each sample was set to N=10. Table 6 shows the results in the case of 1 mm in the outside diameter of the winding core is, and Table 7 shows the results in the case of 2 mm in the outside diameter of the winding core.

TABLE 6

| Sample | Suction Hole Width [mm] | Suction Availability | Winding Deviation |
|---|---|---|---|
| 35 | 0.7 | ○ | Winding Core Breakage |
| 36 | 0.6 | ○ | Winding Core Deformation |
| 37 | 0.5 | ○ | 0% |
| 38 | 0.4 | ○ | 0% |
| 39 | 0.2 | ○ | 0% |
| 40 | 0.1 | Δ | |
| 41 | 0.08 | no suction | |

Separator Width: 30 mm
Electrode Body Outside Diameter: φ8 mm
Winding Core Outside Diameter: φ1.0 mm
Winding Core Inside Diameter: φ0.7 mm
Suction Hole Length: 8 mm
Suction Hole-to-Suction Hole Distance: 3 mm
The Number of Suction Holes: 2
The Number of Samples: 10

TABLE 7

| Sample | Suction Hole Width [mm] | Suction Availability | Winding Deviation |
|---|---|---|---|
| 42 | 0.7 | ○ | 0% |
| 43 | 0.6 | ○ | 0% |
| 44 | 0.5 | ○ | 0% |
| 45 | 0.4 | ○ | 0% |
| 46 | 0.2 | ○ | 0% |
| 47 | 0.1 | Δ | |
| 48 | 0.08 | no suction | |

Separator Width: 30 mm
Electrode Body Outside Diameter: φ8 mm
Winding Core Outside Diameter: φ2.0 mm
Winding Core Inside Diameter: φ0.7 mm
Suction Hole Length: 8 mm
Suction Hole-to-Suction Hole Distance: 3 mm
The Number of Suction Holes: 2
The Number of Samples: 10

It has been confirmed that the winding cores were broken or deformed in the case of Sample 35 (0.7 mm in the width of the elongate hole) and Sample 36 (0.6 mm in the width of the elongated hole) in Table 6. In addition, it has been confirmed that Sample 40 (0.1 mm in the width of the elongate hole) was low in suction power, whereas Sample 41 (0.08 mm in the width of the elongate hole) failed to achieve suction. In addition, it has been confirmed that Sample 47 (0.1 mm in the width of the elongate hole) in Table 7 was low in suction power, whereas Sample 48 (0.08 mm in the width of the elongate hole) failed to achieve suction. Thus, it has been confirmed that in a case where the outside diameter of the winding core is 2 mm or less, the width of the elongate hole is 0.1 mm or more, preferably 0.2 mm or more, and more preferably 0.2 mm or more, and half or less of the outside diameter of the winding core.

The present technology is described below in further detail according to an embodiment.

(1)

A method for manufacturing a battery, the method including:

suctioning a middle part of a strip-shaped separator in a plurality of holes of a winding core in a peripheral surface of the winding core;

preparing a wound body by winding strip-shaped positive and negative electrodes along with the strip-shaped separator around the winding core; and preparing an electrode body by releasing the suction in the holes and pulling out the winding core from the wound body, in which a battery is configured by housing the electrode body in a battery container, the holes are communicated inside with the winging core that has a hollow structure, and the winding core has an outside diameter of 2 mm or less.

(2)

The method for manufacturing a battery according to (1), in which the plurality of holes are arranged in a row in an axial direction of the winding core.

(3)

The method for manufacturing a battery according to (2), in which the plurality of holes are arranged in only a row in an outer periphery of the winding core.

(4)

The method for manufacturing a battery according to any of (1) to (3), in which a width of each of the holes is 0.2 mm or more and ¼ or less of the outside diameter of the winding core.

(5)

The method for manufacturing a battery according to any of (1) to (4), in which a total length of the plurality of holes is 30% or more of a width of the separator and 80% or less of the width of the separator.

(6)

The method for manufacturing a battery according to any of (1) to (5), in which a length of each of the holes is 2 mm or more and 12 mm or less.

(7)

The method for manufacturing a battery according to any of (1) to (6), in which an interval between the holes in an axial direction of the winding core is 2 mm or more and half or less of a width of the separator.

(8)

The method for manufacturing a battery according to any of (1) to (7), in which the winding core has a hollow cylindrical shape, and the plurality of holes are connected to a hollow of the winding core.

(9)

The method for manufacturing a battery according to (8), in which the winding core has an end closed.

(10)

The method for manufacturing a battery according to any of (1) to (9), in which the winding core contains any of stainless steel, cemented carbide, ceramic, and titanium.

(11)

The method for manufacturing a battery according to any of (1) to (10), further including cutting the separator after preparing the wound body and before releasing the suction.

(12)

A battery including an electrode body wound in a cylindrical shape, with a hollow in a center, in which the electrode body has an outside diameter of 10 mm or less, the electrode body has an inside diameter of 2 mm or less, and a ratio of a minimum value of the outside diameter of the electrode body to a maximum value of the outside diameter of the electrode body is 0.99 or more and 1.00 or less.

(13)

A winding device including:

a winding shaft including a winding core; and a support that supports the winding shaft movably in an axial direction of the winding shaft, in which the winding core has an outside diameter of 2 mm or less, and has a plurality of holes in a peripheral surface of the winding core, and the winding core and the winding shaft have a hollow connected to the plurality of holes.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A winding device for providing a battery including a separator, the winding device comprising:
 a winding shaft including a winding core; and
 a support configured to support the winding shaft movably in an axial direction of the winding shaft,
 wherein
 the winding core has an outside diameter from 0.8 mm to 2 mm, and has a plurality of holes in a peripheral surface of the winding core,
 the winding core and the winding shaft have a hollow connected to the plurality of holes, and
 a width of each of the holes is 0.2 mm or more and half or less of the outside diameter of the winding core.

2. The winding device according to claim 1, wherein the plurality of holes are arranged in a row in an axial direction of the winding core.

3. The winding device according to claim 2, wherein the plurality of holes are arranged only in the row in an outer periphery of the winding core.

4. The winding device according to claim 1, wherein a width of each of the holes is 0.2 mm or more and ¼ or less of the outside diameter of the winding core.

5. The winding device according to claim 1, wherein a total length of the plurality of holes is 30% or more of a width of the separator and 80% or less of the width of the separator.

6. The winding device according to claim 1, wherein a length of each of the holes is 2 mm or more and 12 mm or less.

7. The winding device according to claim 1, wherein an interval between the holes in an axial direction of the winding core is 2 mm or more and half or less of a width of the separator.

8. The winding device according to claim 1, wherein
 the winding core has a hollow cylindrical shape, and
 the plurality of holes are connected to a hollow of the winding core.

9. The winding device according to claim 8, wherein the winding core has an end closed.

10. The winding device according to claim 1, wherein the winding core includes one or more of stainless steel, cemented carbide, ceramic, and titanium.

* * * * *